R. J. HAAS.
KITCHEN UTENSIL.
APPLICATION FILED FEB. 25, 1918.
1,275,907.
Patented Aug. 13, 1918.
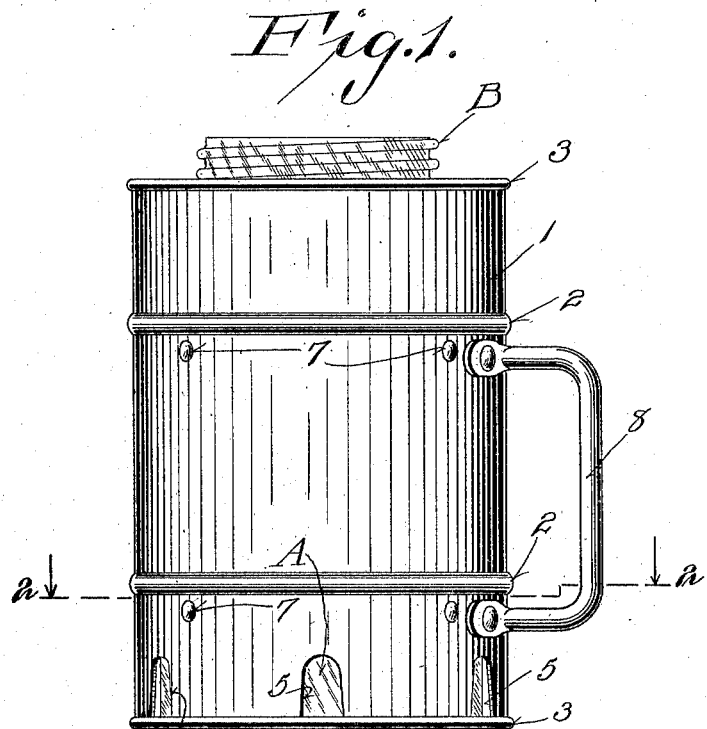
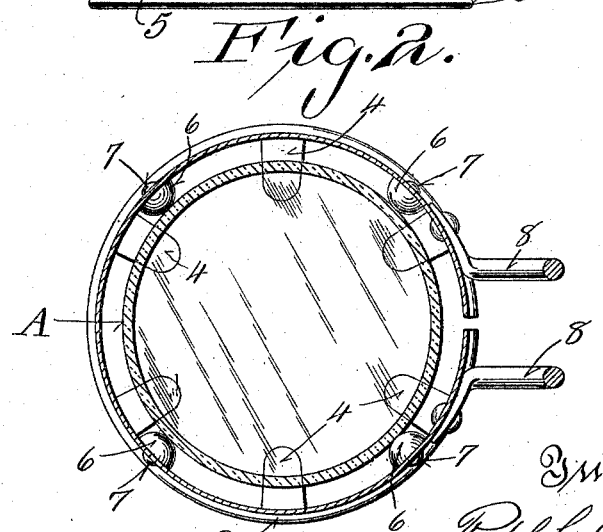

UNITED STATES PATENT OFFICE.

RUDOLPH J. HAAS, OF MILWAUKEE, WISCONSIN.

KITCHEN UTENSIL.

1,275,907. Specification of Letters Patent. Patented Aug. 13, 1918.

Application filed February 25, 1918. Serial No. 219,035.

*To all whom it may concern:*

Be it known that I, RUDOLPH J. HAAS, a citizen of the United States, and resident of Milwaukee, in the county of Milwaukee and State of Wisconsin, have invented certain new and useful Improvements in Kitchen Utensils; and I do hereby declare that the following is a full, clear, and exact description thereof.

My invention relates to kitchen utensils, particularly those which are adapted for use in connection with canning and preserving.

In filling jars or the like with cooked fruits or vegetables for use at a subsequent time, it is customary to first heat the fruits or vegetables and while hot to place them in the containers. Owing to the heat therefore it is rather inconvenient to hold the jars or other containers without a covering of some nature. It is the principal object of the present invention to provide a simply constructed and efficient means for holding the containers while being filled with hot fruits or vegetables. A secondary object is to provide a device of this character which can be quickly and easily associated with the container to be held.

A still further object is to provide a device whereby the screw caps of Mason jars and similar containers may be placed thereon while such containers are in a heated condition.

With these and other objects in view the invention consists in certain novel features of construction, combination and arrangement of parts which will be hereinafter more particularly described and claimed and shown in the drawing, wherein:

Figure 1 represents a side elevational view of a utensil constructed in accordance with my invention, and Fig. 2 is a horizontal section taken on the plane of the line 2—2 of Fig. 1.

Referring more particularly to the drawing wherein similar reference characters indicate like parts in both of the views, it will be seen that the numeral 1 designates a tubular sheet metal casing which is preferably cylindrical or substantially cylindrical in cross section and may be of any appropriate or necessary length, said casing being adapted to receive and grip a cylindrical container such as a glass fruit jar A, the mouth being screw threaded as at B.

The casing 1 is formed of flexible or resilient sheet metal by rolling a plate of material of desired size until its opposite side edges are disposed adjacent each other. This in effect produces a split tubular member having its opposite ends open. In the present instance this tubular member has its intermediate portion reinforced by a pair of ribs 2, and its top and bottom edges strengthened by rolling the same around wires as shown at 3.

The bottom of the casing is provided with means for retaining the jar A therein, such means being formed by a plurality of tongues 4 which project inwardly and radially from the inner wall of the casing adjacent the bottom thereof. These tongues are formed by stamping a plurality of inverted U-shaped slits 5 in the casing and bending the material within these slits inwardly.

The jar A is spaced from the wall of the casing 1 by means of a plurality of resilient semi-spherical buttons or studs 6 which are arranged in two vertically spaced rows and secured in position by rivets 7. This arrangement as shown in Fig. 2 allows air to freely circulate around the jar.

The studs are held in gripping engagement with the jar by moving the edges of the slit in the casing toward each other. This is effectively carried out by the provision of a pair of yoke-like handles 8, each of which is arranged vertically and secured to the wall of the casing. One of these handles is on each side of the slit in said casing so that when they are squeezed together the flexibility of the material from which the casing is formed will permit the jar to be tightly gripped.

Attention is directed to the fact that by the construction shown wherein portions of the side walls are cut away to form tongues, these cut-away portions serve a double purpose. That is they permit the cold air to enter at the bottom of the holder or shell, while at the same time the metal tongues are utilized to support a container. Furthermore in conjunction with this air venting, attention is directed to the fact that by utilizing the two series of yieldable contact buttons, the jar or vessel which is gripped is not liable to breakage, as the gripping is effected by a point contact and the said buttons also space the gripped container or vessel from the solid side walls of the shell in such manner that a current of air is permitted to travel not only up through the space between the vessel and container, but also through the U-shaped side wall openings.

The main object of the device is to hold a hot container, and if this container is gripped over a large portion of its surface, it will exclude the air at these points and thus cause an uneven contraction and a consequent breakage. Practice has demonstrated that by constructing the device as described, the uniform venting and points of contact, will prevent this breakage. The currents of air, which travel about the hot surface of the vessel, will cool it uniformly and quickly. Hence the gripping points mentioned, have a double function.

With a holder of this character a jar or container may be readily filled with hot liquids or solids without any danger of the operator becoming burned. If any of the contents being placed in the container is spilled it will not run over the outside of the casing but will pass between the inner wall of the same and the jar. After the jar has been filled a screw cap may be placed in position and tightly screwed on the threads B before the container is removed from the holder.

I claim as my invention:

A jar holder of the class described comprising an open ended flexible shell provided with a longitudinal slit throughout its length and a series of U-shaped openings therein at its bottom edge to form side wall vents, the cut-out material from the U-shaped openings being bent inwardly from the walls to form spaced tongues that serve as supports for a container, a pair of handles secured to the casing near its slit edges, and two series of spaced rows of resilient buttons extending inwardly from the shell walls to form gripping points for the wall of a container, whereby an uninterrupted air space is formed between the shell walls and container throughout, to permit a current of air to travel about the aforesaid container from end to end in conjunction with the side wall vents, whereby the said container is quickly and uniformly cooled to prevent breakage.

In testimony that I claim the foregoing I have hereunto set my hand at Milwaukee, in the county of Milwaukee and State of Wisconsin.

RUDOLPH J. HAAS.

Copies of this patent may be obtained for five cents each, by addressing the "Commissioner of Patents, Washington, D. C."